(No Model.)

W. F. HEWES.
DRINKING FOUNTAIN FOR FOWLS.

No. 406,095. Patented July 2, 1889.

WITNESSES
James R. Gray
William Brown

INVENTOR
William F. Hewes

UNITED STATES PATENT OFFICE.

WILLIAM F. HEWES, OF SHIRLEY, MASSACHUSETTS, ASSIGNOR OF ONE-HALF TO JOSEPH S. CHERRY, OF SAME PLACE.

DRINKING-FOUNTAIN FOR FOWLS.

SPECIFICATION forming part of Letters Patent No. 406,095, dated July 2, 1889.

Application filed February 4, 1889. Serial No. 298,645. (No model.)

*To all whom it may concern:*

Be it known that I, WILLIAM F. HEWES, a citizen of the United States, and residing at Shirley, in the county of Middlesex and State of Massachusetts, have invented a new and useful Improvement in Drinking-Fountains for Fowls; and I do hereby declare the following to be a full, clear, and exact description thereof, reference being had to the accompanying drawings.

The object of my invention is to provide a construction by means of which the water to be supplied to the fowls may be warmed when so desired, and also to regulate the supply and to exclude dirt and foreign matter from the water.

Figure 1:
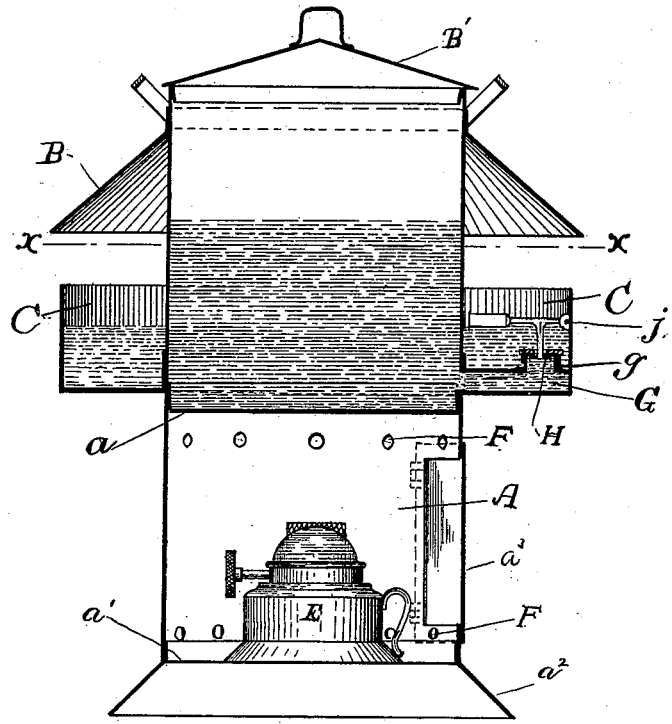
Figure 2:
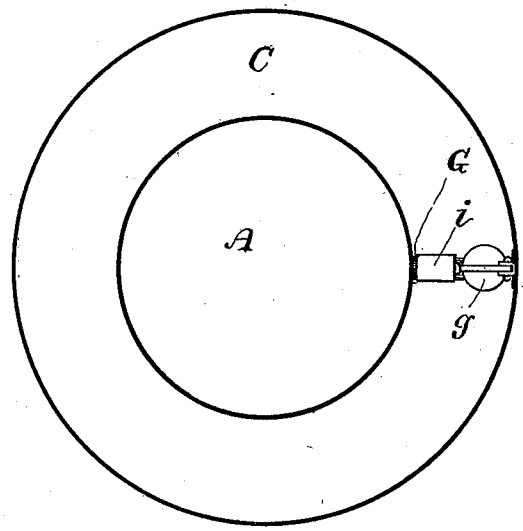

Referring to the accompanying drawings, Figure 1 is a central vertical section showing the several parts of my device in their relative positions. Fig. 2 is a horizontal cross-section on line $x\ x$ of Fig. 1.

The body A is divided into two sections by means of the partition $a$, the upper part or section being adapted to contain water, as shown, and the lower part or section to receive the lamp E, which is used to heat the water in the upper part when desired. The lower section is provided with a door $a^3$, and with a base $a^2$ and floor $a'$. It also has air-holes F F, arranged above and below the lamp E, to insure proper combustion. The upper section or tank is provided with an annular drinking-trough $c$, which preferably encircles the tank. Water is supplied to this trough by means of the educt G, and the flow from the tank into the trough is automatically regulated and controlled by means of the valve H and float $i$, which may be of any convenient form of construction. The float $i$ is hinged to the trough $c$ at $j$, and the valve H is seated against the under side of the screw-cap $g$. By this construction the valve may be easily detached for repairs, and the same packing which packs the screw-cap $g$ serves as a seat and packing for the valve H.

The annular shield or guard B projects from the tank over the trough $c$ and operates to prevent dirt or foreign matter from falling into the trough.

A cover B', of usual construction, closes the top of the tank, as shown.

Having thus described my invention, what I claim is—

A drinking-fountain for fowls, consisting of a lower section or base to receive means for heating the water, and provided with a door and air-holes to regulate the heat, an upper section or tank to contain water and provided with a cover loosely closing the tank, an annular drinking-trough surrounding the tank and provided with an educt leading from the water-tank to the said trough, and a valve and float for automatically regulating and controlling said educt, substantially as set forth.

In testimony whereof I have hereunto set my hand in the presence of two subscribing witnesses.

WILLIAM F. HEWES.

Witnesses:
  JAMES R. GRAY,
  WILLIAM BROWN.